United States Patent
Wang et al.

(10) Patent No.: US 10,846,114 B2
(45) Date of Patent: Nov. 24, 2020

(54) VIRTUAL TIME CONTROL APPARATUS, METHOD, AND NON-TRANSITORY COMPUTER READABLE STORAGE MEDIUM THEREOF

(71) Applicant: Institute For Information Industry, Taipei (TW)

(72) Inventors: Sheng-Hao Wang, New Taipei (TW); Jian-De Jiang, Kaohsiung (TW); Chin-Wei Tien, New Taipei (TW); Chih-Hung Lin, New Taipei (TW)

(73) Assignee: Institute For Information Industry, Taipei (TW)

( * ) Notice: Subject to any disclaimer, the term of this patent is extended or adjusted under 35 U.S.C. 154(b) by 846 days.

(21) Appl. No.: 14/076,436

(22) Filed: Nov. 11, 2013

(65) Prior Publication Data

US 2015/0067673 A1 Mar. 5, 2015

(30) Foreign Application Priority Data

Aug. 27, 2013 (TW) .............................. 102130689 A

(51) Int. Cl.
*G06F 9/455* (2018.01)
(52) U.S. Cl.
CPC ............ *G06F 9/45558* (2013.01); *G06F 2009/45579* (2013.01)
(58) Field of Classification Search
CPC ............... G06F 9/45558; G06F 2009/45579
See application file for complete search history.

(56) References Cited

U.S. PATENT DOCUMENTS

2002/0070783 A1* 6/2002 Saeki ............................ 327/235
2007/0028052 A1* 2/2007 Armstrong et al. .......... 711/129
(Continued)

FOREIGN PATENT DOCUMENTS

| CN | 101441498 A | 5/2009 |
| JP | H01309136 A | 12/1989 |

(Continued)

OTHER PUBLICATIONS

Yourst, Matt. T. PTLsim: A Cycle Accurate Full System x86-64 Microarchitectural Simulator. [online](2007). State University of New York., pp. 1-12. Retrieved From the Internet <http://ai2-s2-pdfs.s3.amazonaws.com/4687/eee983faa06858a3cacef57f8b0af1c7ca3d.pdf>.*

(Continued)

*Primary Examiner* — Emerson C Puente
*Assistant Examiner* — Jonathan R Labud
(74) *Attorney, Agent, or Firm* — Skaar Ulbrich Macari, P.A.

(57) ABSTRACT

A virtual time control apparatus, method, and non-transitory computer readable storage medium thereof are provided. The virtual time control apparatus includes a system timer, a real time clock, and a processing unit, wherein the processing unit is electrically connected to the system timer and the real time clock. The system timer has an original timer period, while the real time clock has an original tick period. The processing unit executes a hypervisor. The hypervisor generates a virtual timer period according to an adjustment ratio and the original timer period. The hypervisor generates a virtual tick period according to the adjustment ratio and the original tick period.

10 Claims, 5 Drawing Sheets

(56) References Cited

U.S. PATENT DOCUMENTS

2008/0240169 A1* 10/2008 Cui et al. .................. 370/516
2011/0161716 A1*  6/2011 Hyvonen ................ G06F 1/14
                                                         713/502
2013/0125118 A1*  5/2013 Niesser et al. .................. 718/1

FOREIGN PATENT DOCUMENTS

| | | |
|---|---|---|
| JP | 2003162428 A | 6/2003 |
| JP | 200438350 A | 2/2004 |
| JP | 2009026248 A | 2/2009 |
| JP | 2011197820 A | 10/2011 |
| JP | 2013114440 A | 6/2013 |
| TW | I283109 B | 6/2007 |
| TW | 201133252 A1 | 10/2011 |

OTHER PUBLICATIONS

Office Action to the corresponding Japanese Patent Application No. 2013228244 rendered by the Japan Patent Office (JPO) dated Aug. 19, 2014, 7 pages (including English translation).

Hirokazu Takahashi "Pictorial Illustration of Design and Installation of Linux Kernel 2.4(3)", Linux Japan, Itsutsubashi Research Co., Ltd., Jan. 1, 2001, vol. 3, No. 13, pp. 122-137.

Office Action to the corresponding Taiwanese Patent Application No. 102130689 rendered by the Taiwan Intellectual Property Office (TIPO) dated Dec. 29, 2014, 11 pages (including English translation).

Office Action to the corresponding Chinese Patent Application rendered by the State Intellectual Property Office of China (SIPO) dated Jan. 3, 2017, 17 pages (including English translation).

\* cited by examiner

|                        | Conventional technology                                                                                                                                                                                                                                                      | The present invention (with an adjustment ratio of 32)                                                                                                                                                                                                                       |
|------------------------|------------------------------------------------------------------------------------------------------------------------------------------------------------------------------------------------------------------------------------------------------------------------------|------------------------------------------------------------------------------------------------------------------------------------------------------------------------------------------------------------------------------------------------------------------------------|
| System Call Summary    | 18:59:18.762: File Open: \??\C:\scripts\<br>...<br>18:59:23.110: File Open: \??\C:\WINDOWS\system32\DNSAPI.dll<br>...<br>19:01:03.289: File Create: \Device\Afd\Endpoint<br>19:01:03.289: Net DNS_LOOKUP: ip: 3ecompany.com<br>19:01:03.290: Net CONNECT: ip: 50.56.91.114, port: 8080<br>...<br>19:05:09.863: File Create: \Device\RasAcd<br>19:05:09.863: Net DNS_LOOKUP: 23.advertising.biz<br>... | 14:20:13.341: File Open: \??\C:\scripts\<br>...<br>14:20:15.579: File Open: \??\C:\WINDOWS\system32\DNSAPI.dll<br>...<br>14:20:21.368: File Create: \Device\Afd\Endpoint<br>14:20:21.368: Net DNS_LOOKUP: 3ecompany.com<br>14:20:21.370: Net CONNECT: ip: 50.56.91.114, port: 8080<br>...<br>14:20:23.308: File Create: \Device\RasAcd<br>14:20:23.308: Net DNS_LOOKUP: 23.advertising.biz<br>... |
| Analysis               | Start time: 18:59:04.784<br>End time: 19:05:09.864<br>360 seconds for 1300 system calls                                                                                                                                                                                      | Start time: 14:20:03.114<br>End time: 14:20:23.542<br>20 seconds for 1300 system calls                                                                                                                                                                                       |

FIG. 5

VIRTUAL TIME CONTROL APPARATUS, METHOD, AND NON-TRANSITORY COMPUTER READABLE STORAGE MEDIUM THEREOF

PRIORITY

This application claims priority to Taiwan Patent Application No. 102130689 filed on Aug. 27, 2013, which is hereby incorporated by reference in its entirety.

FIELD

The present invention relates to a virtual time control apparatus, a virtual time control method, and a non-transitory computer readable storage medium thereof; more particularly, the present invention relates to a virtual time control apparatus, a virtual time control method, and a non-transitory computer readable storage medium thereof that use a system timer and a real time clock.

BACKGROUND

In the information industry, developing application software, providing software information services, and/or providing other software operations all involve an operating system (or operating systems). The real time used by an operating system usually plays a key role in these processes.

Taking the process of developing application software as an example, the software developers have to carry out various tests on the application software. Only when it is ascertained that the application software can operate normally, will it be put into the market. It has been noticed that some application software needs a relatively long testing time to find potential problems. Particularly, when the application software is antivirus software, software developers must carry out various kinds of tests on the antivirus software to ensure that it can protect against attacks from various kinds of malicious software. Since some malicious software may stay in a latent state for a long time, the testing time must be prolonged. When the testing time is prolonged, the cost is increased. Therefore, if the time of the testing environment can be accelerated, the cost can be decreased. Taking cloud service as another example, it is possible that a cloud platform provided by a cloud service provider is attacked by a controlled malicious virtual host. For this scenario, if the system time of the host can be slowed, the damage caused by the attack can be reduced.

FIG. 1 is a schematic view illustrating the actual time used in a conventional operating system 10. The conventional computer system 1 comprises a system timer 11, a real time clock 13, and a processing unit 15, wherein an operating system 10 is executed in the processing unit 15. When being enabled, the operating system 10 transmits a request signal 100 to the real time clock 13. The real time clock 13 transmits a real time 102 to the operating system 10 in response to the request signal 100. The operating system 10 takes the real time as a wall time. Afterwards, the system timer 11 provides a timer triggering signal 104 to the operating system 10 periodically (e.g., once per second) so that the operating system 10 updates its operating time. To be more specific, the operating system 10 takes a sum of the wall time and the operating time as its actual time.

As described above, for the operating system that executed in hardware, the actual time usually plays a key role. For people in the information industry, some of them desire the actual time of the operating system to be accelerated and the other of them desire the actual time to be decelerated.

To satisfy the aforesaid desires, two kinds of conventional technologies for modifying various kinds of times used by an operating system have been developed. The first kind of technology is to modify parameters inside an operating system kernel that are related to time. However, different operating systems have to be modified individually, which is very inconvenient. Furthermore, for operating systems (e.g., Windows) without released source codes, there is no solution. The second kind of technology adopts API hooking mechanism for operating system functions and then modifies time parameters for these functions. This kind of technology requires acquisition of all functions related to the time in advance. In case a function is modified, concealed, or is not allowed to be modified, the modification will be incomplete.

Accordingly, there is an urgent need for a system time control mechanism that does not need to modify the kernel of the operating system, does not have to intercept the system function calls, and is suitable for different operating systems.

SUMMARY

To overcome the problems of the prior art, the present invention provides a virtual time control apparatus, a virtual time control method, and a non-transitory computer readable storage medium thereof.

The virtual time control apparatus of certain embodiments of the present invention comprises a system timer, a real time clock, and a processing unit, wherein the processing unit is electrically connected to the system timer and the real time clock. The system timer has an original timer period, while the real time clock has an original tick period. The processing unit is configured to execute a hypervisor. The hypervisor is configured to generate a virtual timer period according to an adjustment ratio and the original timer period. The hypervisor is also configured to generate a virtual tick period according to the adjustment ratio and the original tick period.

The virtual time control method provided in certain embodiments of the present invention is for use in a hypervisor that is executed in a processing unit. The virtual time control method comprises the steps of (a) generating a virtual timer period according to an adjustment ratio and an original timer period of a system timer and (b) generating a virtual tick period according to the adjustment ratio and an original tick period of a real time clock.

The non-transitory computer readable storage medium provided in certain embodiments of the present invention has a computer program stored therein. The computer program executes a virtual time control method after being loaded into a hypervisor executed on a processing unit. The computer program comprises code A and code B. The code A is executed by the hypervisor to generate a virtual timer period according to an adjustment ratio and an original timer period of a system timer. The code B is executed by the hypervisor to generate a virtual tick period according to the adjustment ratio and an original tick period of a real time clock.

In certain embodiments of the present invention, the hypervisor executed by the processing unit adjusts the original timer period of the system timer into the virtual timer period according to the adjustment ratio and adjusts the original tick period into the virtual tick period according to the adjustment ratio. When an operating system is also executed by the processing unit, the hypervisor further generates a virtual real time to the operating system according to an original real time of the real time clock and the virtual tick period. Additionally, the hypervisor transmits a triggering signal to the operating system periodically according to the virtual timer period. In this way, the operating system can take the virtual real time as a wall time, use the triggering signal to update an operating time thereof, and then take a sum of the wall time and the operating time as the actual time it uses.

Since certain embodiments of the present invention generate the virtual timer period, the virtual tick period, the virtual real time period, and the triggering signal by the hypervisor executed in the processing unit, the present invention does not need to modify the kernel of the operating system, does not have to intercept the system function calls, and is suitable for time control mechanisms of various operating systems.

BRIEF DESCRIPTION OF THE DRAWINGS

FIG. 5 depicts experimental data of time amounts taken to monitor a same number of system calls.

DETAILED DESCRIPTION

In the following description, the virtual time control apparatus, the virtual time control method and the non-transitory computer readable storage medium thereof of the present invention will be explained with reference to example embodiments thereof. However, these example embodiments are not intended to limit the present invention to any specific environment, example, embodiment, applications, or particular implementations described in these example embodiments. Therefore, description of these example embodiments is only for purpose of illustration rather than to limit the present invention. It should be appreciated that elements unrelated to the present invention are omitted from depiction in the following embodiments and the attached drawings.

Figure 1:
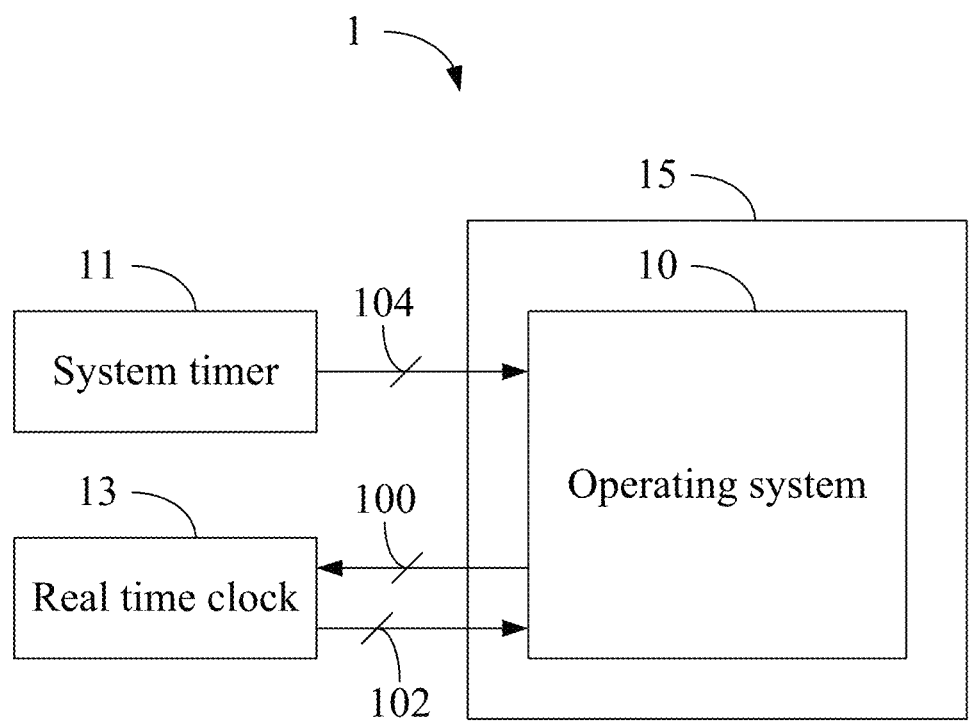
FIG. 1 is a schematic view of the actual time used by a conventional operating system.
Figure 2:
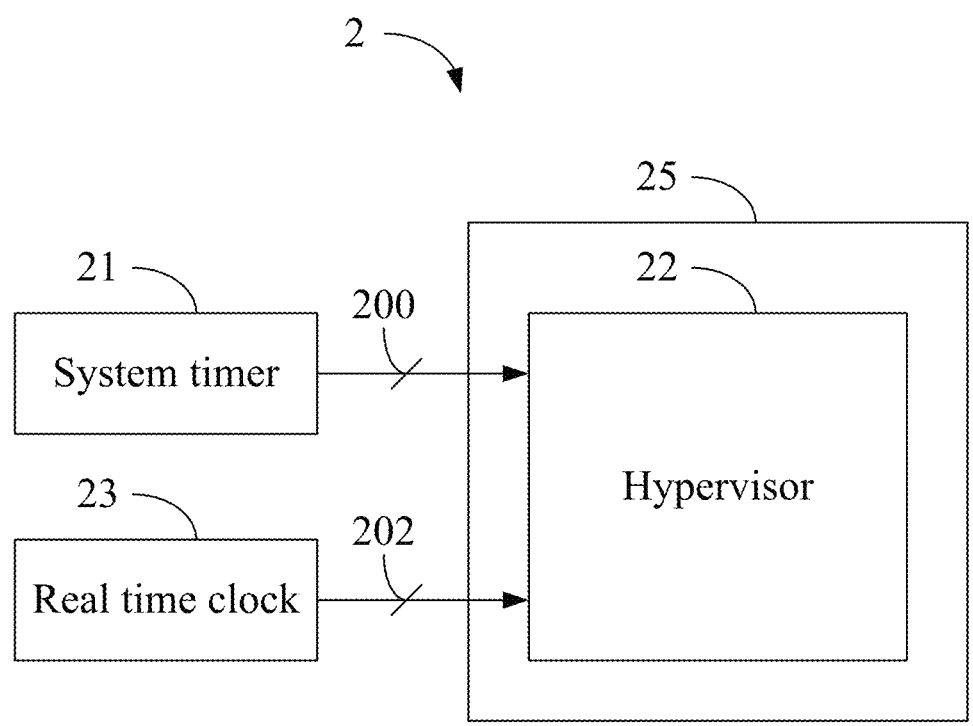
FIG. 2 depicts a virtual time control apparatus according to a first embodiment of the present invention.

A first embodiment of the present invention is a virtual time control apparatus 2, a schematic view of which is shown in FIG. 2. The virtual time control apparatus 2 comprises a system timer 21, a real time clock 23, and a processing unit 25. The processing unit 25 is electrically connected to the system timer 21 and the real time clock 23. The processing unit 25 executes a hypervisor 22, which may be considered as virtual hardware implemented by software.

The processing unit 25 may be any of various processors, central processing units (CPUs), microprocessors, or other kinds of computing devices that are well known to those of ordinary skill in the art. Additionally, functions and operations of the system timer 21 and the real time clock 23 are well known to those of ordinary skill in the art, so no further description will be made thereon herein.

In this embodiment, the system timer 21 has an original timer period 200, while the real time clock 23 has an original tick period 202. The system timer 21 provides the original timer period 200 to the hypervisor 22, while the real time clock 23 provides the original tick period 202 to the hypervisor 22. The hypervisor 22 generates a virtual timer period (not shown) according to an adjustment ratio (not shown) and the original timer period 200. In addition, the hypervisor 22 generates a virtual tick period (not shown) according to the adjustment ratio and the original tick period.

Being an example, the adjustment ratio may be a positive number. The hypervisor 22 may generate the virtual timer period by dividing the original timer period 200 by the adjustment ratio and generates the virtual tick period by dividing the original tick period 202 by the adjustment ratio. If the adjustment ratio is greater than 1, it means that an operating frequency that can be supplied by the hypervisor 22 is higher than operating frequencies of the system timer 21 and the real time clock 23. On the other hand, if the adjustment ratio is smaller than 1, it means that the operating frequency that can be provided by the hypervisor 22 is lower than the operating frequencies of the system timer 21 and the real time clock 23.

Following that, the hypervisor 22 may generate related time information according to the virtual timer period and the virtual tick period and provide the related time information to software or hardware that needs the time information. In this way, the technology disclosed in the first embodiment can adjust the time information without the need of modifying the kernel of the operating system and intercepting the system function calls, and is suitable for various operating systems.

Figure 3:
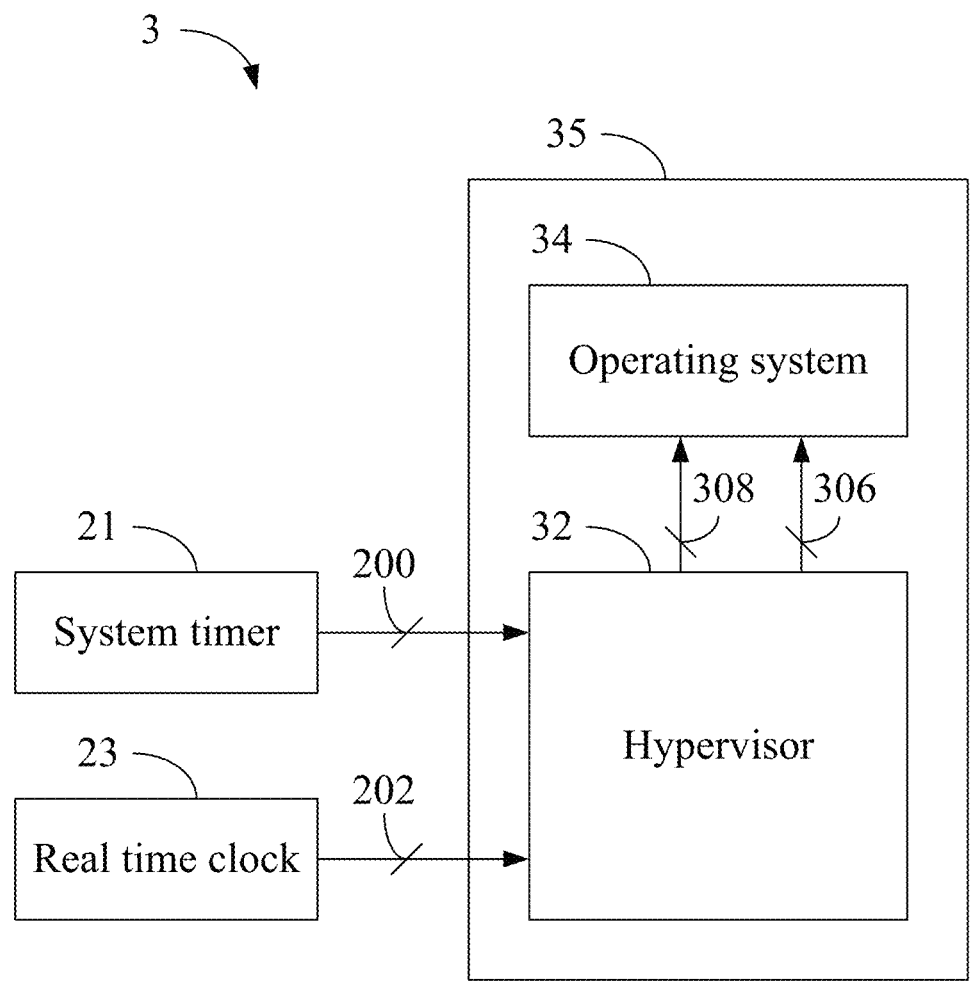
FIG. 3 depicts a virtual time control apparatus according to a second embodiment of the present invention.

A second embodiment of the present invention is a virtual time control apparatus 3, a schematic view of which is shown in FIG. 3. The virtual time control apparatus 3 comprises a system timer 21, a real time clock 23, and a processing unit 35 electrically connected to the system timer 21 and the real time clock 23. The system timer 21 and the real time clock 23 comprised in the virtual time control apparatus 3 are identical to those comprised in the virtual time control apparatus 2. The processing unit 35 executes a hypervisor 32 and an operating system 34, wherein the hypervisor 32 may be considered as virtual hardware implemented by software. Likewise, the processing unit 35 may be any of various processors, CPUs, microprocessors, or other kinds of computing devices that are well known to those of ordinary skill in the art.

As in the first embodiment, the hypervisor 32 generates a virtual timer period (not shown) according to an adjustment ratio (not shown) and the original timer period 200 of the system timer 21. Also, the hypervisor 32 generates a virtual tick period (not shown) according to the adjustment ratio and the original tick period 202 of the real time clock 23.

In this embodiment, the hypervisor 32 generates the virtual real time clock and further generates a virtual real time 306 according to the virtual real time clock and the virtual tick period. Then, the hypervisor 32 provides the virtual real time 306 to the operating system 34 and transmits a triggering signal 308 to the operating system 34 according to the virtual timer period. The triggering signal 308 may be a triggering signal for triggering virtual timing or some other triggering signal.

Thereafter, the operating system 34 takes the virtual real time 306 as a wall time, uses the triggering signal 308 to update an operating time, and then takes a sum of the wall time and the operating time as an actual time. Furthermore, a time stamp counter (TSC), a programmable interval timer (PIT), and an advanced programmable interrupt controller (APIC) used by the operating system 34 will also be adjusted according to the new operating time and the virtual real time 306.

According to the above descriptions, the hypervisor 32 generates the virtual timer period and the virtual tick period, generates a virtual real time 306 for the operating system 34 according to the virtual real time clock and the virtual tick period, and transmits a triggering signal 308 to the operating system 34 periodically according to the virtual timer period. Through this mechanism, the actual time used by the operating system 34 is generated according to the virtual real time 306 and the triggering signal 308 supplied by the hypervisor 32. Accordingly, for different application fields, the actual time of the operating system can be accelerated or decelerated by the information engineers through setting the adjustment ratio used by the hypervisor 32. This embodiment can adjust the time information without the need of modifying the kernel of the operating system and intercepting the system function calls, and is suitable for various operating systems.

Figure 4:
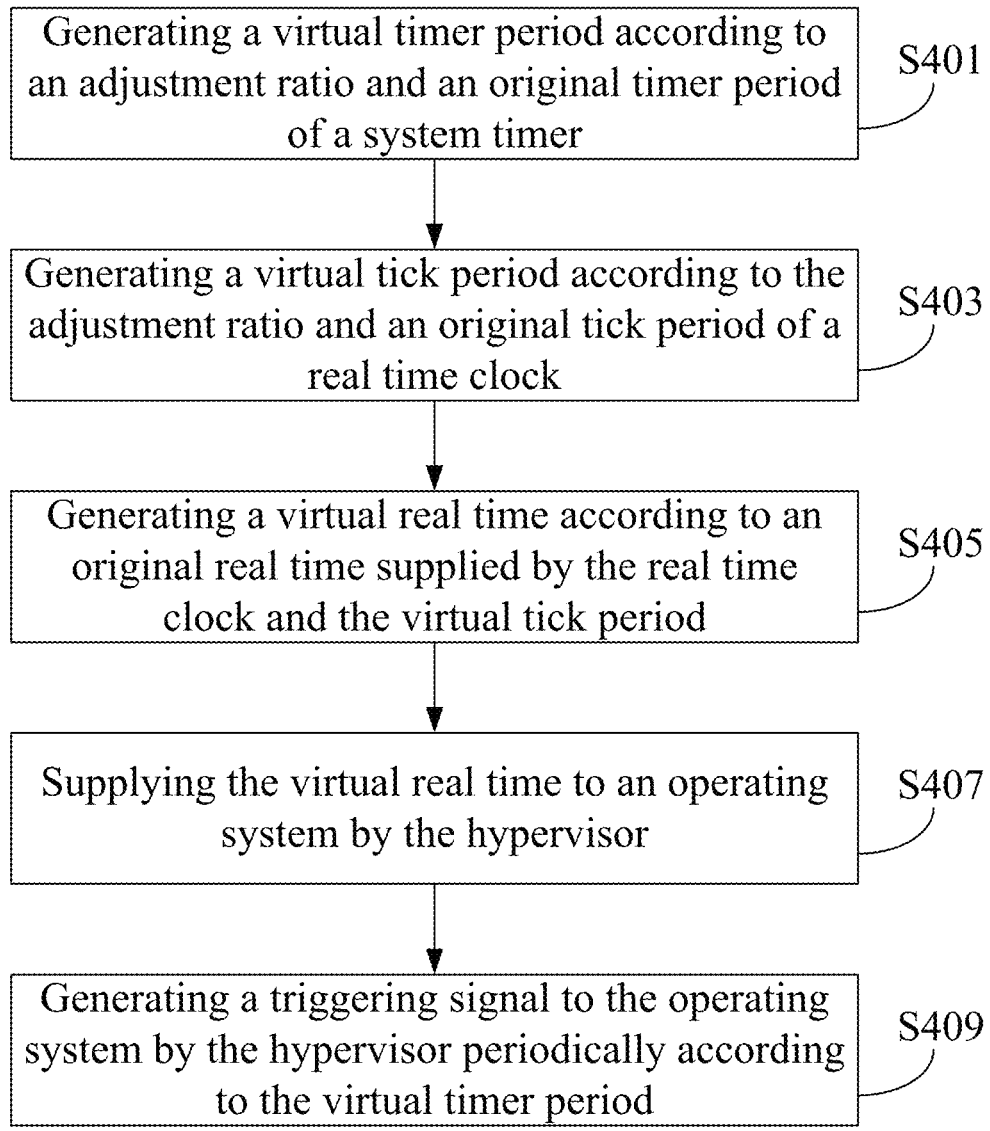
FIG. 4 is a flowchart diagram of a virtual time control method according to a third embodiment of the present invention.

A third embodiment of the present invention is a virtual time control method, a flowchart diagram of which is shown in FIG. 4. The virtual time control method is executed by a hypervisor executed in a processing unit (e.g., the aforesaid processing unit 25 or 35). The virtual time control method may be used for software testing.

First, step S401 is executed so that a virtual timer period is generated by the hypervisor according to an adjustment ratio and an original timer period of a system timer. Then, in step S403, a virtual tick period is generated by the hypervisor according to the adjustment ratio and an original tick period of a real time clock. It shall be appreciated that the steps S401 and S403 may be executed in a reverse order or be executed simultaneously.

Being an example, the adjustment ratio may be a positive number. The virtual timer period may be generated by dividing the original timer period by the adjustment ratio in the step S401, while the virtual tick period may be generated by dividing the original tick period by the adjustment ratio in the step S403. If the adjustment ratio is greater than 1, it means that an operating frequency that can be supplied by the hypervisor is higher than operating frequencies of the system timer and the real time clock. On the other hand, if the adjustment ratio is smaller than 1, it means that the operating frequency that can be provided by the hypervisor is lower than the operating frequencies of the system timer and the real time clock.

Next in step S405, a virtual real time clock is generated by the hypervisor and a virtual real time is generated by the hypervisor according to the virtual real time clock and the virtual tick period. Subsequently in step S407, the virtual real time is supplied by the hypervisor to an operating system, which may be executed in the aforesaid processing unit or in a different processing unit. Thereafter, a triggering signal is generated to the operating system by the hypervisor periodically according to the virtual timer period in step S409.

Through the aforesaid steps, the operating system can take the virtual real time as a wall time thereof, use the triggering signal to update an operating time thereof, and then take a sum of the wall time and the operating time as the real time it uses.

In addition to the aforesaid steps, the third embodiment can also execute all the operations and functions set forth in the first embodiment and the second embodiment. How the third embodiment executes these operations and functions will be readily appreciated by those of ordinary skill in the art based on the explanation of the first embodiment and the second embodiment, and thus will not be further described herein.

Furthermore, the virtual time control method of the third embodiment may be implemented by a computer program having a plurality of codes. The computer program is stored in a non-transitory computer readable storage medium. When the computer program is loaded into a processing unit and the codes are executed by the processing unit, the virtual time control method of the third embodiment can be accomplished. The non-transitory computer readable storage medium may be a read only memory (ROM), a flash memory, a floppy disk, a hard disk, a compact disk (CD), a mobile disk, a magnetic tape, a database accessible to networks, or any other storage media with the same function and well known to those skilled in the art.

FIG. 5 depicts experimental data of time amounts taken to monitor a same number of system calls. In this experiment, a processor of Intel Xeon E5-2620 2.00 GHz, a memory of DDR-1333 32 GB, a hard disk capacity of 2 TB, an operating system of Debian 6.0 kernel 3.3.0, an Xen hypervisor 4.0.3, and an adjustment ratio of 32 were used.

From the experimental data shown in FIG. 5, the 1300 system calls appear in similar order and have similar contents for both the present invention and the prior art. It should be mentioned that when the adjustment ratio used by the present invention is set to be 32, the time required by the present invention is only about 5% of that required by the conventional technology. That is, a significant improvement on the execution efficiency is achieved.

In the present invention, the hypervisor adjusts the original timer period of the system timer into the virtual timer period according to the adjustment ratio. In addition, the hypervisor adjusts the original tick period into the virtual tick period according to the adjustment ratio. When an operating system is also executed by the processing unit, the hypervisor further generates a virtual real time clock and generates a virtual real time to the operating system according to the virtual real time clock and the virtual tick period. Additionally, the hypervisor transmits a triggering signal to the operating system periodically according to the virtual timer period. In this way, the operating system can take the virtual real time as a wall time thereof, use the triggering signal to update an operating time thereof, and then take a sum of the wall time and the operating time as the actual time it uses.

Since the present invention generates the virtual timer period, the virtual tick period, the virtual real time period, and the triggering signal by the hypervisor executed in the processing unit, the present invention does not need to modify the kernel of the operating system and intercept the system function calls and is suitable for time control mechanisms of various operating systems.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A virtual time control apparatus, comprising:
a system timer, having an original timer period;
a real time clock, having an original tick period; and a processing unit, being electrically connected to the system timer and the real time clock and configured to execute a hypervisor and an operating system, wherein the hypervisor is configured to generate a virtual timer period according to an adjustment ratio and the original timer period, generate a virtual tick period according to the adjustment ratio and the original tick period, generate a virtual real time clock, and generate a virtual real time according to the virtual real time clock and the virtual tick period, wherein the virtual timer period is different from the original timer period and the virtual tick period is different from the original tick period, wherein the virtual real time is either accelerated when the adjustment ratio is greater than 1 or decelerated when the adjustment ratio is smaller than 1 with respect to the real time clock, wherein the hypervisor further provides the virtual real time to the operating system.

2. The virtual time control apparatus of claim 1, wherein the hypervisor further generates a triggering signal to the operating system periodically according to the virtual timer period.

3. The virtual time control apparatus as of claim 2, wherein the operating system further takes the virtual real time as a wall time and uses the triggering signal to update an operating time.

4. The virtual time control apparatus of claim 1, wherein the adjustment ratio is a positive number.

5. The virtual time control apparatus of claim 1, wherein the hypervisor generates the virtual timer period by dividing the original timer period by the adjustment ratio and generates the virtual tick period by dividing the original tick period by the adjustment ratio.

6. A virtual time control method for use in a hypervisor, an operating system and the hypervisor being executed in a processing unit, the virtual time control method comprising the steps of:

generating a virtual timer period according to an adjustment ratio and an original timer period of a system timer;

generating a virtual tick period according to the adjustment ratio and an original tick period of a real time clock;

generating a virtual real time clock;

generating a virtual real time according to the virtual real time clock and the virtual tick period; and providing the virtual real time to the operating system, wherein the virtual timer period is different from the original timer period and the virtual tick period is different from the original tick period, wherein the virtual real time is either accelerated when the adjustment ratio is greater than 1 or decelerated when the adjustment ratio is smaller than 1 with respect to the real time clock.

7. The virtual time control method of claim 6, wherein the virtual time control method further comprises the steps of:

generating a triggering signal to the operating system periodically according to the virtual timer period.

8. The virtual time control method of claim 6, wherein the adjustment ratio is a positive number.

9. The virtual time control method of claim 6, wherein the virtual timer period is obtained by dividing the original timer period by the adjustment ratio, and the virtual tick period is obtained by dividing the original tick period by the adjustment ratio.

10. A non-transitory computer readable storage medium, having a computer program stored therein, an operating system and a hypervisor being executed on a processing unit, the computer program executing a virtual time control method after being loaded into the hypervisor executed on the processing unit, and the computer program comprising:

a code A for enabling the hypervisor to generate a virtual timer period according to an adjustment ratio and an original timer period of a system timer;

a code B for enabling the hypervisor to generate a virtual tick period according to the adjustment ratio and an original tick period of a real time clock;

a code C for enabling the hypervisor to generate a virtual real time clock;

a code D for enabling the hypervisor to generate a virtual real time according to the virtual real time clock and the virtual tick period; and a code E for enabling the hypervisor to provide the virtual real time to the operating system, wherein the virtual timer period is different from the original timer period and the virtual tick period is different from the original tick period, wherein the virtual real time is either accelerated when the adjustment ratio is greater than 1 or decelerated when the adjustment ratio is smaller than 1 with respect to the real time clock.

* * * * *